Figure 1:
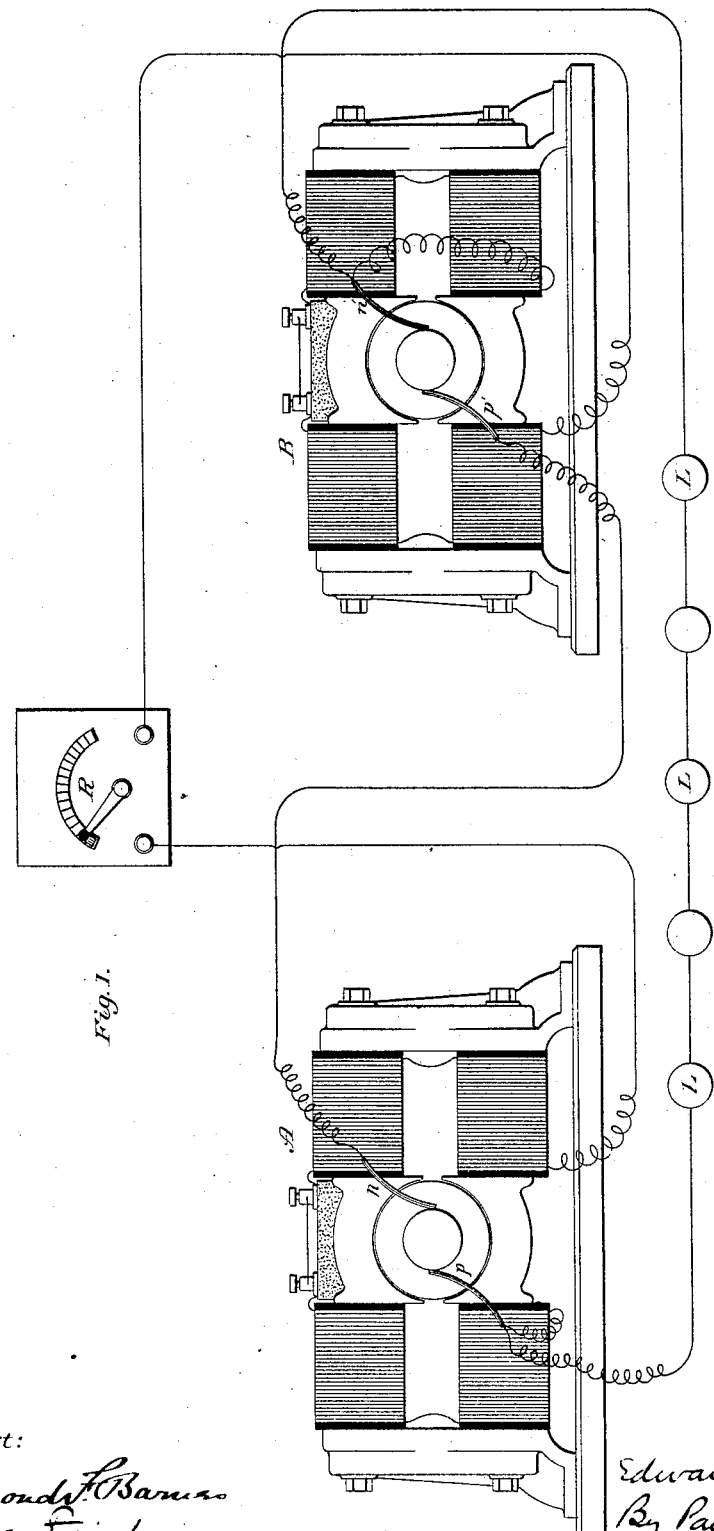

(No Model.) 2 Sheets—Sheet 1.

E. WESTON.
DYNAMO ELECTRIC MACHINE.

No. 283,548. Patented Aug. 21, 1883.

Attest:
Raymond F. Barnes
W. Frisby

Inventor:
Edward Weston
By Parker W. Page
Atty.

(No Model.)  2 Sheets—Sheet 2.

E. WESTON.
DYNAMO ELECTRIC MACHINE.

No. 283,548. Patented Aug. 21, 1883.

Attest:
Raymond F. Barnes.
W. Fristy.

Inventor:
Edward Weston
By Parker W. Page
atty.

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

DYNAMO-ELECTRIC MACHINE.

SPECIFICATION forming part of Letters Patent No. 283,548, dated August 21, 1883.

Application filed February 5, 1883. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Dynamo-Electric Machines, of which the following is a specification, reference being had to the drawings accompanying and forming a part of the same.

This invention relates to dynamo-electric machines in which the circuit energizing the field-magnets is derived from the main or armature-circuit; and the main object of the invention is to run two or more of such machines in series without altering the character of the machines or incurring the risks incident to the use of such machines under these circumstances.

In what are known as "derived-field-circuit machines" the collecting-brushes are connected direct to the main binding-posts. The field-circuit, which is of relatively high resistance, is formed between any two points in the circuit on opposite sides of the collecting or commutator brushes. When such a machine is started up, the current flows through the field-circuit from the positive to the negative brush or binding-post. Which is the positive and which the negative brush or binding-post is determined by the residual magnetism of the field on starting the machine, and the direction of rotation of the armature. When two or more machines of this kind are coupled in series—that is to say, when the positive post of one is connected to the negative of the next—the normal action of the series is the same as when any other kinds of machine are used, the electro-motive force of the series being equal to the sum of the electro-motive forces of all the machines. Should the main circuit, however, happen to be interrupted at any point between the binding-posts of the machine—as, for instance, by the separation, even for a moment, of the commutator-brush from its commutator—the only path for the main circuit would be for the time through the field of the machine in which the interruption occurs. As a result, a current is passed through the field in a reverse direction, so that the magnetism of the field and signs of the binding-posts are reversed, and when the armature-circuit is again closed the machine develops a current opposed to that of the other machine. It has been proposed to excite the field-magnets of a number of machines coupled in series by a circuit derived from the armature of one of the machines. This does not, however, overcome the difficulties, nor render it possible to use machines all of the same character. For instance, should the circuit be interrupted between the binding-posts of the machine from which the shunt is taken, the residual magnetism of the fields would produce enough current in the armatures of the other machines to completely demagnetize said machines by flowing in a reverse direction through the field-circuit. It is also evident that the machine from which the shunt-circuit is taken would have to be capable of producing a higher electro-motive force than it would had it to excite its own field alone; otherwise the requisite magnetism could not be imparted to the fields. The same results would follow in any case where the field-circuit is in derivation to any number of machines less than the whole. By including the fields of all the machines in a shunt or derived circuit taken from the terminal machines of the series these difficulties are mainly overcome. I have found, however, that when a number of derived-circuit-field machines are run in this manner, a somewhat greater degree of magnetic saturation is imparted to each field in the series, other things being equal, than would be imparted were the field-circuit's shunts from each armature. It is therefore necessary, in order to run the machines under their normal conditions, to make the derived field-circuit of a series of machines of a resistance greater than the aggregate resistance of the separate field-circuits, and for this purpose I include an artificial resistance in the derived circuit. In practice I employ for this purpose an ordinary adjustable resistance or rheostat.

The nature and objects of the invention will be more fully described by reference to the drawings, in which—

Figure 2:
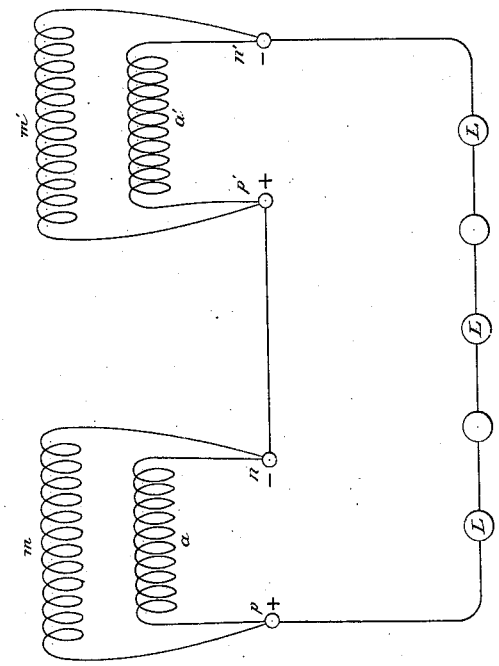

Figure 1 is a diagram of two machines, the circuit-connections being made in accordance with my invention; Fig. 2, a diagram of circuits in the case of two derived-field-circuit machines coupled in the ordinary manner, and Fig. 3 a similar diagram of the circuit-connections in my system.

Though two machines only are shown, it is evident that a greater number may be used in the same manner.

Figure 3:
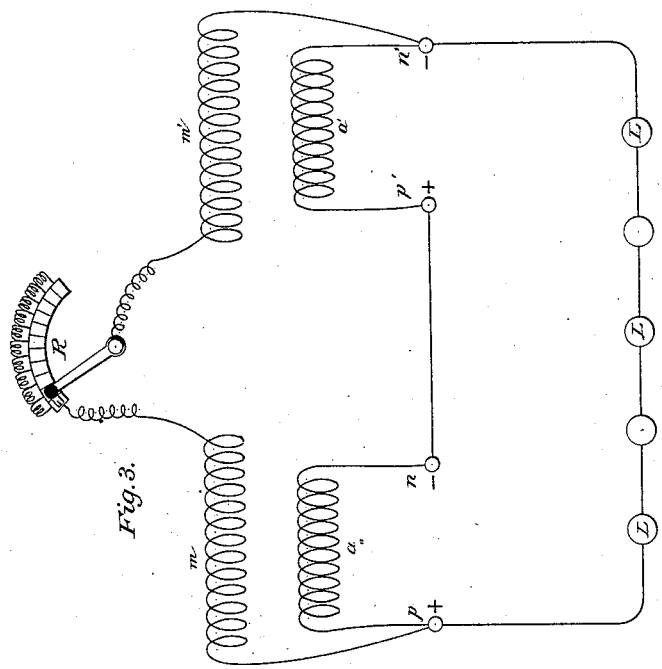

Referring, therefore, to Fig. 2 as an illustration of the principles involved, let $a$ and $a'$ designate the armatures of two machines which are connected in series in a circuit containing lamps or other devices, L. This is done by connecting the positive binding post or brush $p$ of armature $a$ with one terminal of the line, the negative brush $n'$ of armature $a'$ with the other, and connecting the remaining brushes, $n$ and $p'$, together. The fields of the two machines are excited by derived circuits $m$ and $m'$, and the relative resistance of these circuits is such as to impart a certain degree of magnetic saturation to the fields. When these machines are run, it is evident that any interruption in circuit $a$ between the points $p$ and $n$, or in circuit $a'$ between $p'$ and $n'$, would cause a reversal of the current in the corresponding circuits, $m$ or $m'$, and a consequent reversal of the machine in which the interruption took place. To avoid this, therefore, the derived circuit is taken from the opposite poles of the terminal machines of the series, as shown in Fig. 3, where $m\ m'$ represent the field-coils of machines connected in the same derived circuit from the opposite poles of the machines of which $a\ a'$ are the armature-coils. In this case, however, as stated above, the magnetism imparted to the fields by the derived circuit is greater than that imparted by the circuits $m$ and $m'$ when arranged as in Fig. 2. It is therefore necessary to insert in the derived field-circuit a resistance, R, which, by changing the relation between the main and field circuits, permits a small amount of current to pass through it.

The arrangement of machines illustrated by these diagrams is shown in Fig. 1, where A and B represent the machines, of which $p\ n$ and $p'\ n'$ are the brushes or binding-posts, respectively; and L, lamps or any other devices included in the main or working circuit. In the derived circuit taken from post $p$ to post $n'$, and carried around both field-magnets, I insert a variable resistance, R, which may be employed to raise the resistance of the field-circuit, and to vary it also, when so desired, for purposes of regulation.

I am aware that the fields of machines with armatures connected in series have been excited by independent sources of current, and also by a shunt or derived circuit from one or more of the machines. I am also aware that rheostats have been included in exciting circuits for controlling the generation of current. These features are not included in my present invention.

What I claim is—

1. The combination of two or more dynamo-machines, constructed or wound as described, to operate as derived-field-circuit machines, a main circuit including the armatures, a derived or shunt circuit taken from the terminal machines of the series, and an artificial resistance included in said circuit, for the purpose set forth.

2. The combination of two or more dynamo-electric machines, a main circuit including the armatures, a derived or shunt circuit taken from the terminal machines of the series and including all the field-magnets of the same, and a rheostat or adjustable resistance included in the derived circuit, as and for the purpose set forth.

In testimony whereof I have hereunto set my hand this 30th day of January, 1883.

EDWARD WESTON.

Witnesses:
HENRY A. BECKMEYER,
JOHN C. YOUNG.